United States Patent [19]

Thompson

[11] 4,187,628

[45] Feb. 12, 1980

[54] IDENTIFICATION DEVICE

[76] Inventor: Howard J. Thompson, 4300 N. Barnes, Apt. 108, Oklahoma City, Okla. 73112

[21] Appl. No.: 809,084

[22] Filed: Jun. 23, 1977

[51] Int. Cl.² .......................... G09F 3/20; G09F 3/14; B32B 3/06; A47G 1/12

[52] U.S. Cl. .................................... 40/10 D; 40/2 A; 40/20 R; 428/99; 428/101; 428/136; 428/137; 428/13; 428/14

[58] Field of Search .................. 40/10 R, 2 R, 2 A, 5, 40/6, 10 D, 20 R, 20 A; 428/98, 99, 101, 142, 913, 13, 14, 137, 134, 136; D19/13, 18, 19; 63/18, 19; 283/19, 20

[56] References Cited

U.S. PATENT DOCUMENTS

| | | | |
|---|---|---|---|
| 384,426 | 6/1888 | Cohn | 63/18 |
| 760,410 | 5/1904 | Arnold | 40/10 R |
| 944,744 | 12/1909 | Pine | 40/10 R |
| 958,620 | 5/1910 | Gardner | 40/10 R |
| 1,534,684 | 4/1925 | Chilson | 428/14 |
| 2,176,698 | 10/1939 | Albrecht | 40/10 D |
| 2,385,778 | 10/1945 | Evalt | D19/19 X |
| 2,556,825 | 6/1951 | Smith | 40/2 R |
| 2,655,747 | 10/1953 | Duskin | 40/6 |
| 3,616,121 | 10/1971 | Freundich | 428/101 |
| 3,974,581 | 8/1976 | Martens et al. | 40/20 R |

*Primary Examiner*—George F. Lesmes
*Assistant Examiner*—Alexander S. Thomas
*Attorney, Agent, or Firm*—William R. Laney

[57] ABSTRACT

An identification device including a flexible securing element and a three-part composite tag connected to the securing element. The three-part composite tag includes a pair of outer elements of complementary elliptical configuration, and a central indicia-carrying element of elliptical configuration which is complementary to the outer elements. The elements of the tag are interconnected for pivotation about a common pivotal axis for movement from a registering, superimposed position to an expanded, separated relationship. The outer elements are at least partially transparent to permit visual observation of indicia on one or both of the opposite sides of the central element.

1 Claim, 5 Drawing Figures

IDENTIFICATION DEVICE

BACKGROUND OF THE INVENTION

1. Field of the Invention

This invention relates to identification tags for use on luggage and the like, and more particularly, to identification tags which are rigid or semi-rigid in nature, and facilitate viewing of an indicia-carrying sheet or plate through transparent superimposed plates or elements.

2. Brief Description of the Prior Art

A number of types and designs of identification tags suitable for attachment to luggage and the like have heretofore been devised. Such tags must meet several criteria in order to enjoy the widest acceptance by luggage owners. First, the tags preferably are of a permanent or semipermanent nature in the sense of being rugged and sufficiently resistant to crumpling or abrasion that the tags can withstand the rigors of careless handling of the luggage which is frequently experienced during transit. Further, identification tags are preferably aesthetic in character, and do not present an unsightly appendage to the luggage. Since luggage is often selected largely on the basis of its aesthetic quality, it is important that the identification tag complement the luggage, and be smart and neat in appearance.

Another desideratum in luggage identification tags is the capability of quickly placing certain identifying and descriptive indicia on the tag, and of altering or replacing such indicia quickly and easily at any time that it is desirable to do so. For example, where the owner's address is changed, or where the luggage is given as a gift to a person who may wish to place indicia of his or her choice on the identification tag, it is important that the placement of the identifying indicia or marks on the tag can be accomplished quickly, without special tools, and in such manner that the marks conveying the desired information to a viewer can be erased or at least quickly changed in the event different information becomes appropriate to include on the tag.

A number of types of identification tags have heretofore been proposed and used with varying degrees of success for the purpose of affixation to luggage, and conveyance of meaningful information to an observer.

One type of identification tag which has previously been proposed is that which is shown in Duskin U.S. Pat. No. 2,540,718. In the Duskin patent, the tag described is a composite structure which includes a recessed plate or panel constructed of a synthetic resin material, a second plate or panel which may be pivotally connected or secured by a rivet or the like to the first panel, and a pocket or recess formed in one or the other of the two panels for the purpose of receiving small indicia-carrying blocks or tabs, such as tabs upon which the owner's initials are inscribed. When the first and second panels are moved into a superimposed or overlying position, they may be retained in this position to hold the indicia-carrying tabs between the two panels and in the described recess by means of a suitable strap or chain extended through aligned holes in the panels. In order to change or alter the indicia or information-conveying element in the Duskin identification tag, it is necessary to remove and replace the tabs carrying the indicia and located in the recess, substituting new indicia-carrying tabs for those previously in use.

A generally similar type of structure is provided in the form of a combined key chain and locket as shown in Arnold U.S. Pat. No. 760,410. Here, a cover plate or panel of generally elliptical configuration is retained over a similarly shaped recessed panel which functions to receive in the recess some type of indicia-carrying card which will function to identify the owner of the keys carried on a key chain attached to the superimposed panels or plates. The key chain links can be extended through a hollow rivet used to join the two plates to each other.

In Kocsi U.S. Pat. No. 2,720,777, a structure is provided in which a pair of superimposed clear or transparent plastic plates 16 and 18 sandwich between them an indicia-bearing card or element, with such indicia being visible through the plastic plates at the opposite sides of the superimposed plastic elements.

Other luggage identification tag structures are shown in U.S. Pat. No. 2,556,825 (which depicts and describes an essentially laminated tag structure); U.S. Pat. No. 2,655,747; U.S. Pat. No. 2,176,253, and U.S. Pat. No. 944,744. One of the aspects of all of these identification structures which renders the use of such devices less than optimum is the inability to very rapidly and quickly place any desired indicia in a protected location within the structure where it can be easily viewed from multiple angles by an observer remote from the structure, and then to just as quickly and easily alter such indicia at any time and for whatever reason the owner of the identification tag may wish to do so.

GENERAL DESCRIPTION OF THE PRESENT INVENTION

The present invention provides an improved identification device susceptible to rapid affixation to luggage or the like, which device can be economically manufactured, is rugged and durable in use, and which facilitates, during usage, the rapid placement of selected indicia on the device, or the changing of such indicia at any time.

Broadly described, the identification device of the invention comprises a flexible securing element which can be formed as a loop with a portion or bight of the loop extended through a three-part composite identification tag for purposes of attaching the tag to the luggage. The three-part composite tag includes a pair of transparent outer elements of complementary elliptical configuration, and a central indicia-carrying element, also of an elliptical configuration which is complementary to the two outer elements. Each of the elliptical elements is flat and is formed as a panel or plate.

The three elements of the composite tag are interconnected for pivotation about a common pivotal axis which extends normal to the major plane of each of the elements and interconnects them for movement between a registering, superimposed position in which the central element is sandwiched between the two outer transparent synthetic resin elements, and an expanded, separated positional relationship in which the three elements are fanned out, or only two of the three are superimposed upon each other. The central element is frosted or treated so as to provide a surface receptive to ink or pencil marks, and which will retain such marks without flowing or smearing, but which facilitates quick and easy removal of such marks at any time as it may be desired to remove them and replace them with other marks.

An important object of the present invention is to provide an identification device which is aesthetic in appearance and which is very functional in permitting identifying indicia, as well as advertising, to be viewed from each of the opposite sides of the device over a relatively large surface area.

Another object of the invention is to provide an identification device in which informational indicia may be provided on each of the opposite sides of a thin central plate at a location where it is protected, and yet visible from each of the opposite sides of the identification device.

A further object of the invention is to provide a neat and aesthetically sized and configured identification tag for use on luggage or the like, which, without being excessively large, nevertheless provides sufficient space to allow information concerning the destination of the luggage to which it is affixed to be placed in a readily visible location, and also to permit information as to the owner's name and home address to be similarly displayed.

A further object of the invention is to provide an identification device which can be secured to luggage by means of a leather strap which is securely engaged with an indicia-displaying identification tag as a result of the strap being extended through a large slot through the tag, thereby distributing any breaking or disengagement force to a major portion of the tag, rather than to a limited area around a small hole.

A further object of the invention is to provide an identification device which includes a quickly and easily accessible indicia-receptive plate element which can be exposed while supported upon a rigid element so as to permit a large, flat surface area of the indicia-receptive plate element to be scribed or marked with identifying indicia while the receiving surface is supported from beneath by the supporting element.

Another object of the invention is to provide an identification device which can be quickly assembled and disassembled to permit a particular type of advertising material to be placed within the device in a clearly visible location without impairing the functionality of the device as an identification instrumentality.

Additional objects and advantages of the invention will become apparent as the following detailed description of preferred embodiments of the invention is read in conjunction with the accompanying drawing which illustrates certain preferred embodiments of the invention.

GENERAL DESCRIPTION OF THE DRAWINGS

DETAILED DESCRIPTION OF A PREFERRED EMBODIMENT OF THE INVENTION

Figure 1:
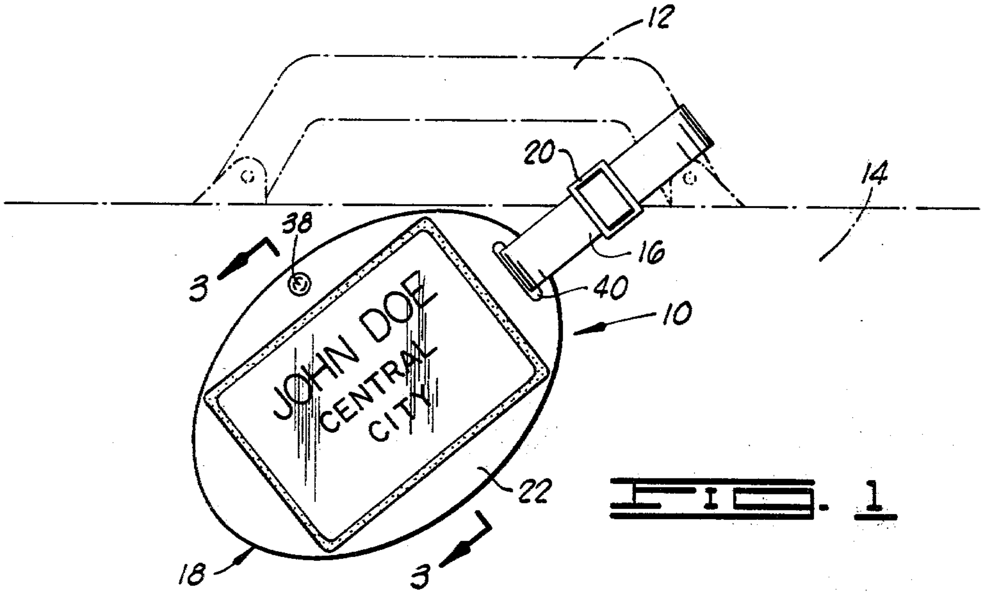
FIG. 1 is a view in elevation of one embodiment of an identification device constructed in accordance with the present invention and illustrating in dashed lines, the handle of luggage to which the identification device is attached.

Referring initially to FIG. 1 of the drawings, the identification device 10 of the present invention is illustrated as it appears when attached to the handle 12 of luggage 14. The identification device includes a strap 16 and a three-part composite identification tag designated generally by reference numeral 18. The strap 16 is preferably constructed of leather and is looped around the luggage handle 12 and secured by means of a suitable buckle 20 or the like.

Figure 2:
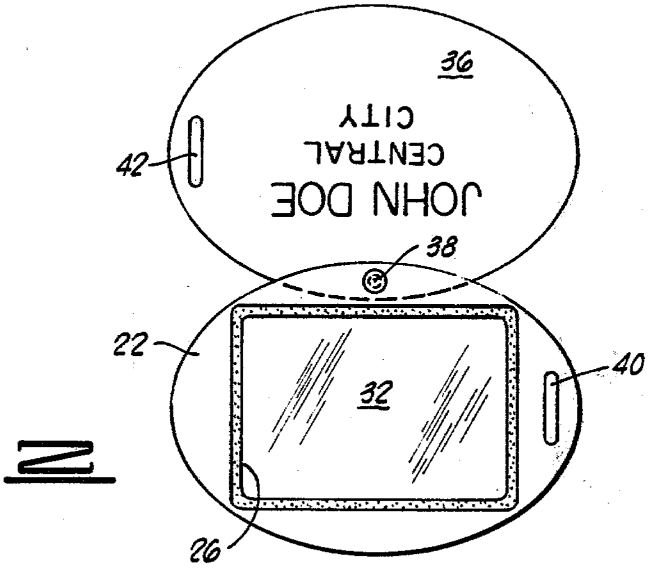
FIG. 2 is a view in elevation of the identification device shown in FIG. 1 as it appears when a central indicia-carrying element of the identification device is pivoted outwardly to an expanded and exposed position.
Figure 3:
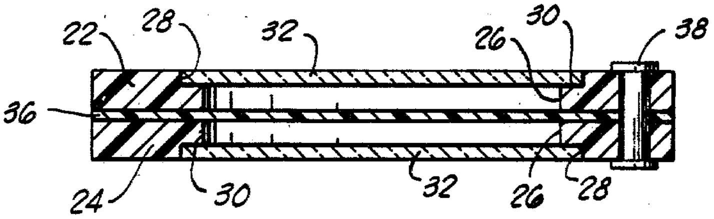
FIG. 3 is a sectional view taken along line 3—3 of FIG. 1.

The composite identification tag 18 includes, as shown in FIG. 3, a pair of outer plates or panels 22 and 24. The outer panels 22 and 24 are constructed of a relatively rigid synthetic resin, such as plexiglass, and are substantially identically configured as an ellipse. The panels 22 and 24 may be transparent or colored, but in the embodiment illustrated in FIGS. 1–3, are colored plastic materials. Each of the panels 22 and 24 has a relatively large rectangularly shaped central aperture 26 formed therein and projecting into an inner surface disposed at one side of the respective panel. The aperture or opening 26 intersects at an outwardly lying, relatively larger rectangular recess 28 which defines a shoulder 30 facilitating the mounting in the recess 28 of a clear transparent window 32. The windows 32 thus disposed in the two panels 22 and 24 can be secured in the recesses 28 by a suitable adhesive or bonding material.

Disposed between the outer panels 22 and 24 is a central plate 36 which is characterized in having an elliptical configuration substantially identical to the configuration of the outer panels. The central plate 36 is relatively thin as compared to the thickness of the outer panels 22 and 24. Moreover, the central plate 36 includes an uninterrupted (non-apertured) surface on each of the opposite sides thereof so that a large surface area on each side of the central plate 36 is visible through the windows 32 on opposite sides of the identification tag 18 when the two outer panels 22 and 24 and the central plate 36 are superimposed over each other in the positions shown in FIGS. 1 and 3.

The central plate 36 is preferably frosted, etched or roughened along its exposed surfaces so as to provide indicia-receptive areas capable of having indicia scribed thereon for viewing through the transparent windows 32 associated with the two outer panels 22 and 24. A preferred material of construction for the central plate 36 is a high impact styrene type polymer. Preferably, the thickness of the central plate 36 is from about one-fifth to about one-third that of the two outer panels 22 and 24.

The outer panels 22 and 24 are secured to each other and to the central plate 36 for pivotation about a common pivotal axis which extends normal to the major plane of each of the three elements. In the illustrated embodiment, a pop rivet 38 is utilized for effecting the described pivotal interconnection and is positioned, in the illustrated embodiment, at a location adjacent the periphery of the panels 22 and 24 and central plate 36. Preferably, the rivet 38 is positioned on a minor axis of each of the three ellipses. It will be perceived in referring to FIGS. 1 and 3 that the effect of this joindure is to permit the outer panels 22 and 24 and the central plate 36 to be swung into a position such that the identically configured elements are superimposed one upon the other with the outer panels sandwiching the central plate 36 between them. It is also possible to swivel the outer panels 22 and 24 relative to each other about the rivet 38; and to obtain relative swinging movement of the central plate 36 in relation to one or both of the two outer panels 22 and 24.

At a time when the strap 16 is used for securing the identification tag 18 to the handle 12 of the luggage 14, the strap, as a closed loop or band, extends through an elongated slot 40 formed at the same location in each of the outer panels 22 and 24 and through an aligned slot 42 formed in the central plate 36. When the outer panels and central plate are in their superimposed positions as shown in FIGS. 1 and 3, the slots 40 in the outer panels are aligned and in registry with the slot 42 in the central plate. When the strap 16 is extended through these aligned slots, the superimposed relationship of the outer panels 22 and 24 and the central plate 36 is retained, and pivoting movement of these panels and this plate with respect to each other about the pivotal axis constituted by the rivet 38 is prevented.

In the use of the embodiment of the invention depicted in FIGS. 1–3, selected indicia or indicia-carrying elements are initially located inside the identification tag 18 in a position to be viewed through one or both of the transparent windows 32. This may be accomplished in various ways. First, a pencil or pen may be used for writing upon one or both of the opposed sides of the central plate 36 over portions of the plate which are exposed to view through the windows 32 of the outer panels 22 and 24. Thus, there is shown in FIGS. 1 and 2 a situation where the name and address of the luggage owner has been written upon one side of the central plate 36 at a location to permit such indicia to be viewed through the window 32. The placement of the desired writing upon the central plate 36 in the manner described can be easily accomplished by pivoting or swinging the central plate outwardly after detachment of the strap 16, so that a large surface area is exposed to enable the writing to be accomplished.

It will be apparent, of course, that indicia may be placed on each of the opposed sides of the central plate 36 to allow viewing from opposite sides of the identification tag 18. Frequently, it will be desirable to set forth on the other side of the central plate, the destinaton of the luggage or where it should be sent, in the event of loss. It should also be pointed out that where the high impact styrene material of construction is used in the central plate 36, the information to be placed on this plate can be printed thereon by a silk screen process, utilizing a variety of background colors. Usually where this is to be done, a form will be printed on opposite sides of the central plate 36 in which such key indicia as name, address, city, state, telephone number, etc., may be placed on one side of the plate to identify the home residence of the luggage owner, and similar indicia placed on the opposite side of the central plate for purposes of describing the destination of the luggage—each key word being set opposite a blank so that the specific information can be filled in by the user as may be appropriate to the situation.

Another mode of utilizing the embodiment of the identification device shown in FIGS. 1–3 is to place printed cards bearing informational indicia or advertising in the pockets or cavities which are formed and defined between the transparent windows 32 and the opposed surfaces of the central plate 36. Such cards may be in addition to, or in lieu of, the indicia scribed directly on the opposed indicia-receptive surfaces of the plate 36. Brightly colored tags 18 can be made up when the construction illustrated in FIGS. 1–3 is utilized, with a multiplicity of colors being displayed either by reason of the types of cards inserted in the cavities defined between the central plate and the outer panels, or by various pigments being included in the synthetic resins themselves in the course of manufacture, or by scribing appropriate indicia or color patterns upon the opposed sides of the central plate 36.

It should be pointed out that because of the manner in which the opposed sides of the central plate 36 are etched or frosted, lead markings from a pencil or ink from a pen can be easily wiped away from these surfaces to clean the surfaces at such time as it may be desired to change the type or nature of the writing or other indicia which is displayed on opposed surfaces of the plate.

Figure 4:
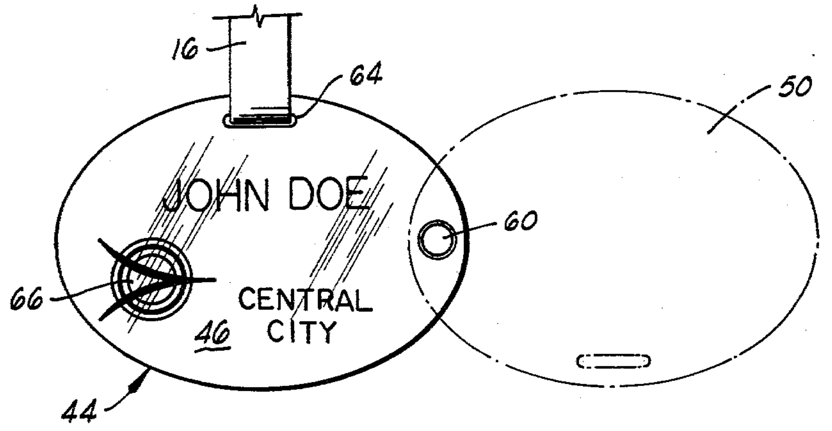
FIG. 4 is a view in elevation of an alternate embodiment of the present invention.
Figure 5:
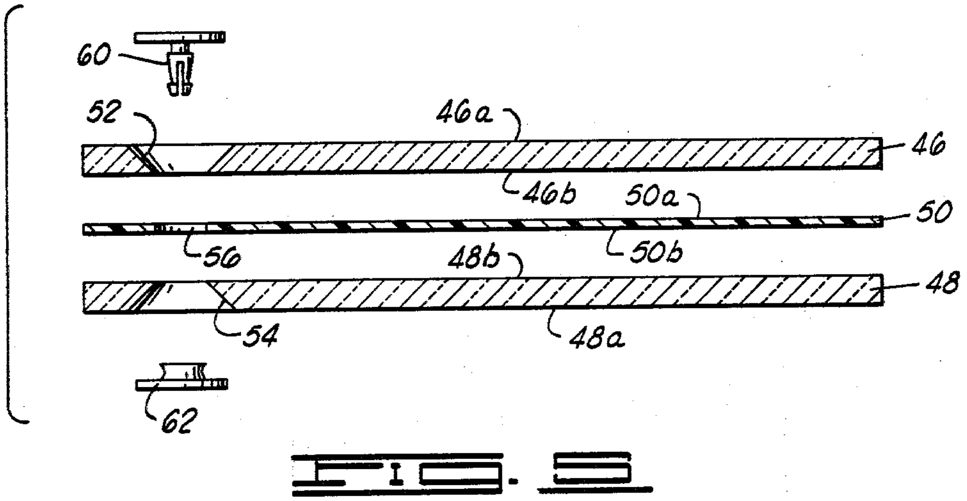
FIG. 5 is an exploded, partially sectional, partially elevational view of the structure shown in FIG. 4.

A different and preferred embodiment of the invention is illustrated in FIGS. 4 and 5 of the drawings. In this instance, the identification tag 44 again includes a pair of elliptically shaped outer panels 46 and 48 and a relatively thin central plate 50. It will be perceived that the outer panels 46 and 48 do not include or define any recess or opening in the central portion thereof, as do the outer panels 22 and 24 illustrated in FIGS. 1–3 of the drawings. Each of the outer panels 46 and 48 includes a pair of opposed, substantially monoplanar surfaces. These are designated by reference numerals **46*a* and 46*b*, in the case of the panel 46, and 48*a* and 48*b* in the case of the panel 48. In like manner, the thin central plate 50 includes a pair of opposed substantially monoplanar surfaces 50*a* and 50*b*. The materials of which the outer panels 46 and 48 and the central plate 50 are constructed are identical to the materials described in referring to the embodiment depicted in FIGS. 1—3**.

At a location near the periphery of each of the panels 46 and 48 and the central plate 50, and along a major axis of each of these elliptical elements, each of the elements is provided with a fastener-receiving hole or aperture. Thus, a tapered or bevelled aperture 52 is formed in the plate 46, and a tapered aperture 54 is formed in the plate 48. These are positioned to register with an aperture 56 formed through the central plate 50. The apertures 52 and 54 in the outer panels 46 and 48 are dimensioned so that a snap fastener of a type hereinafter described can be placed in a retaining position to hold the panels 46 and 48 in abutting contact with the central plate 50, and the heads of the opposed parts of the snap fastener will be countersunk and will not protrude or project above the outer surfaces **46*a* and 48*a* of the outer panels 46 and 48. The snap fastener used for interconnecting the outer panels 46 and 48 and central plate 50 is a two-part structural element which includes a bifurcated male button 60 and a flanged, female socket button 62. When the buttons 60 and 62 are pressed through the aligned apertures 52, 54 and 56 and interengage with each other, they retain the panels 46 and 48 and central plate 50 in a pivotally interconnected relationship where these elements may be pivoted into a superimposed registering position as shown in full lines in FIG. 4**, or may be flared or pivoted outwardly so that any one or all three of the elements is in an expanded, non-overlapping or non-registering relationship.

Each of the three elements of the composite identification tag shown in FIGS. 4 and 5 carries an elongated slot in similar fashion to the embodiment of the invention illustrated in FIGS. 1–3. In this instance, however, the elongated slots are, in each case, disposed near the periphery of the respective element of the tag at a location on the minor axis of each elliptical element. The slot 64 which is provided in the plate 46 at this location is depicted in FIG. 4. The aligned slots again function to receive the strap 16 by which the composite tag 44 is secured to the luggage.

The preferred embodiment of the identification device of the invention, as illustrated in FIGS. 4 and 5, offers several advantages. First, by reason of the use of a two-part snap fastener which includes the buttons 60 and 62, the panels 46 and 48 and central plate 50 can be quickly and easily disengaged from each other. It is only necessary to insert a thumbnail under the flanged part of one of the buttons 60 and 62 and pry it upwardly to effect disengagement of the two button parts as shown in FIG. 5. The panels 46 and 48 and central plate 50 can then be opened apart from each other, thus facilitating the replacement of the central plate 50 with another central plate which can be of a different color or have entirely different indicia or advertising material thereon. Thus, if a particular logo or other advertising indicia of the sort indicated by reference numeral 66 is silk screened or placed upon the central plate 50, such advertising material may become obsolete or inappropriate to the company manufacturing the tags or selling the luggage, or to an airline which may make the tags available as a premium item for travelers on the line. In this case, the composite identification tag 44 can be easily snapped open by releasing the buttons 60 and 62 from each other, and an indicia-receptive central plate 50 carrying an entirely different logo or advertising can be inserted between the outer panels 46 and 48.

Another important advantage of the embodiment of the invention illustrated in FIGS. 4 and 5 is the greater ease with which indicia may be written upon either of the opposed surfaces 50*a* and 50*b* of the central plate 50. Thus, where it may be desired to erase or change indicia written upon one side of the plate 50, this plate and one of the panels 46 or 48 may be swung outwardly from a position of alignment or registry with the other of the two outer panels so that one surface of the plate 50 is exposed, and the other surface abuts flatly against that panel swung outwardly with it. There is thus afforded a firm writing surface or support immediately beneath the central plate 50 so that indicia can be written upon the exposed surface of this plate without difficulty in a legible and even manner. The same type of arrangement can be achieved with respect to the opposite surface of the central plate 50 by simply using the other one of the outer panels 46 or 48 for support.

From the foregoing description of preferred embodiments of the invention, it will be perceived that though such depicted and described embodiments provide a clear indication of the manner in which the principles of the invention are incorporated in physical form, various changes and innovations representing departures from the precise form of the invention shown and described herein can be effected without departure from such basic principles. Changes and innovations of this type are therefore deemed to be circumscribed by the spirit and scope of the invention except as the same may be necessarily excluded by the appended claims, or reasonable equivalents thereof.

What is claimed is:

1. An identification device comprising:

a pair of synthetic resin outer plate elements of complementary elliptical configuration each including a transparent portion, each of said outer plate elements further characterized in having a rectangular opening positioned centrally therein and extending therethrough and constituted by a first recess projecting from one side thereof toward the other side of the respective plate element, and a second recess in each of said outer plate elements registering and communicating with the first recess therein and projecting into the respective outer plate element opposite said first side, said second recess being larger in area than said first recess and defining therewith a peripheral shoulder bordering said opening;

a transparent window disposed in each of said second recesses;

a flat central synthetic resin element of elliptical configuration which is complementary to the outer elements and is disposed therebetween, said central element including opposed surfaces textured for retention of indicia marked thereon in alignment with said transparent portion of said outer plate elements, and in a position for viewing through said transparent windows;

fastening means extending through said outer plate elements and said flat central element at a location on one of the major or minor axes of the outer plate elements and central element, and interconnecting said outer and central elements in overlapped, superimposed abutting contact for pivotation about a common axis located adjacent a peripheral edge of each of the elements and on said axes to facilitate movement of said plate elements and central element between registering, superimposed positions, and positions in which said elements are out of alignment with each other, said outer plate elements and central element each further including a slot formed therethrough and located on the other major or minor axis of the respective elliptical element from that upon which said fastening means is located, said slots being dimensioned and positioned for alignment with each other when said outer elements and central elements are in registering, superimposed positions, said fastening means comprising frictionally engaged, quick releasable cooperating male and female fastener elements; and a flexible securing element detachably connected to said outer and central elements by extension through said aligned slots therein.

* * * * *